Aug. 7, 1956  S. A. MALTHANER  2,757,971
DUAL WHEEL SPACER BLOCK
Filed May 18, 1953  2 Sheets-Sheet 1

Inventor
Sylvester A. Malthaner
By McCanna and Morsbach
Attys.

Aug. 7, 1956 S. A. MALTHANER 2,757,971
DUAL WHEEL SPACER BLOCK
Filed May 18, 1953 2 Sheets-Sheet 2
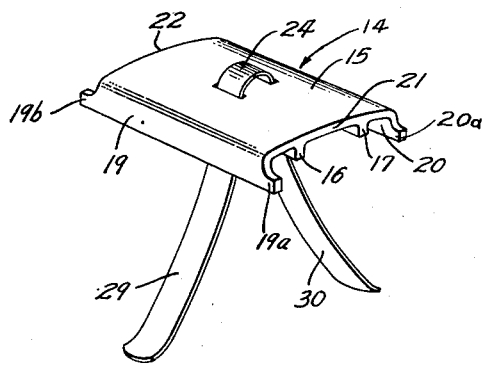
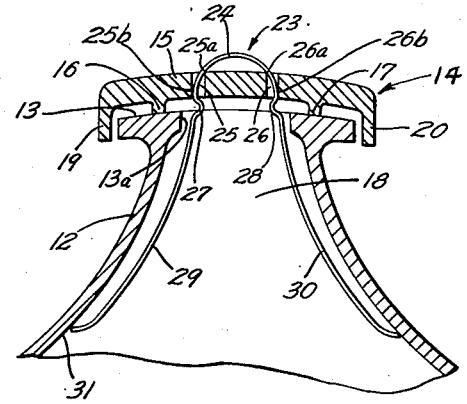
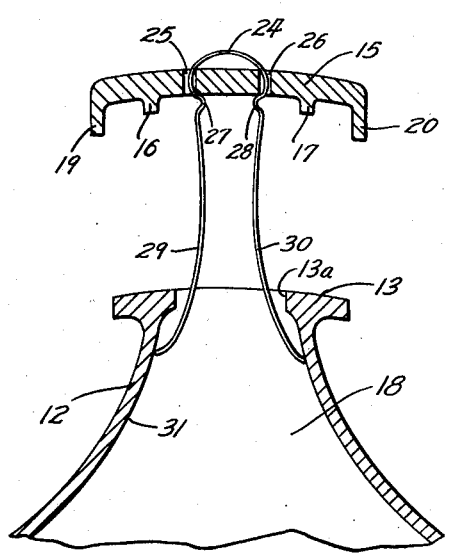
Inventor
Sylvester A. Malthaner
By McCanna and Morsbach
Attys.

United States Patent Office 2,757,971
Patented Aug. 7, 1956

2,757,971
DUAL WHEEL SPACER BLOCK

Sylvester A. Malthaner, Rockford, Ill., assignor to Gunite Foundries Corporation, Rockford, Ill., a corporation of Illinois Application May 18, 1953, Serial No. 355,495

18 Claims. (Cl. 301—36)

This invention relates to structures of the dual wheel type used on trucks and other heavy vehicles, and particularly to a spacer block for spacing apart the tire rims on a dual wheel assembly.

It is an object of this invention to provide a novel and improved spaced block for releasable attachment onto a hollow spoke end of a cast metal wheel to space apart the rims of two tires mounted in spaced parallel relation on that wheel.

It is also an object of this invention to provide a spacer block of this type having a novel arrangement for releasable attachment onto a hollow spoke end of a wheel.

Another object of the present invention resides in the provision of a novel spacer block of this type constructed to be retained securely on the hollow spoke end of a wheel when used to space apart two tire rims mounted on the wheel.

A further object of this invention is to provide a novel spacer block of this type constructed to have engagement entirely across each of its end faces with the inboard and outboard tire rims, respectively, to provide in a dual wheel assembly a tire rim spacing arrangement of improved stability and rigidity.

An additional object of this invention is to provide a novel dual wheel assembly which includes a wheel having hollow spokes open at their outer ends and the spacer blocks of the present invention releasably mounted on the outer ends of the wheel spokes.

Other and further objects and advantages of the present invention will be apparent from the following description of a preferred embodiment thereof, illustrated in the accompanying drawings.

In the drawings:

Figure 3 is a perspective view of the spacer block and the mounting spring therefor;

Figure 4 is a section along the line 4—4 in Fig. 2, showing the spacer block mounted on the hollow spoke end of the wheel; and Figure 5 is an exploded section similar to Fig. 4 and showing the relationship of the parts when the spacer block is being assembled onto the spoke end of the wheel or is being removed therefrom.

Figure 1:
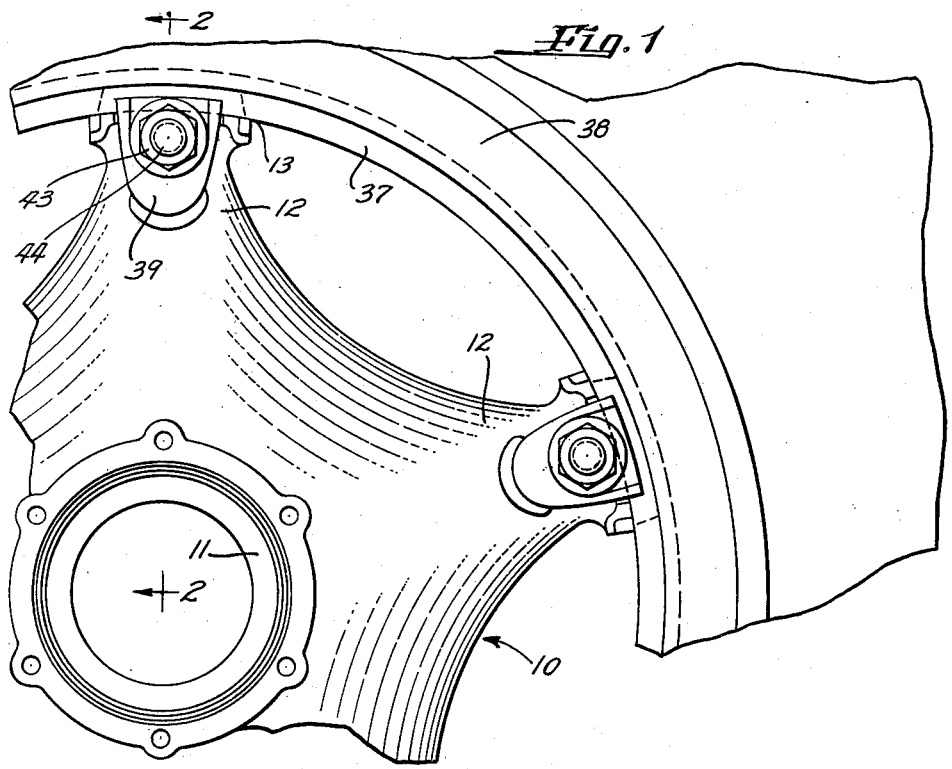
Figure 1 is a fragmentary plan view of a dual wheel assembly incorporating spacer blocks constructed in accordance with the present invention.
Figure 2:
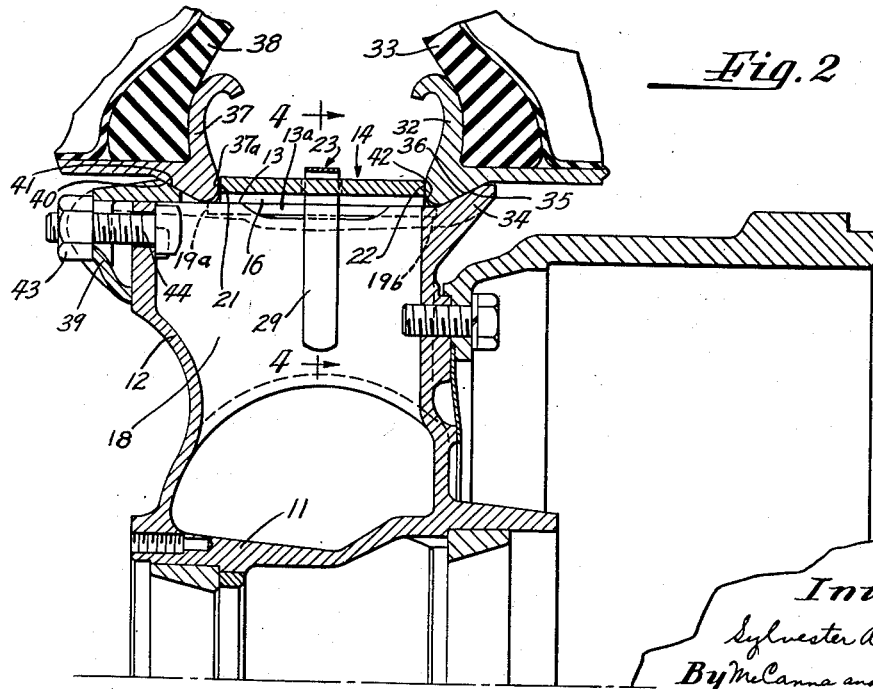
Figure 2 is a fragmentary section through this assembly taken along the line 2—2 in Fig. 1.

Referring to Figs. 1 and 2, there is shown a conventional wheel 10 having a hub 11 and a plurality of hollow spokes 12 radiating outward from the hub. Each spoke terminates in an arcuate outer end 13 (Fig. 2) at which is mounted the spacer block of the present invention, indicated generally at 14. The arcuate outer end of the spoke is formed with an opening 13a leading to the cavity 18 within the hollow spoke.

The spacer block is shown in detail in Figs. 3–5 and is in the form of a cast body having an arcuate top wall 15 concentric with the arcuate outer end of the respective spoke. A pair of depending ribs 16, 17 extend down from the top wall of the spacer block to engage the outer end 13 of the spoke on opposite sides of the opening 13a therein (Fig. 4). At its opposite sides the spacer block is formed with a pair of depending flanges 19 and 20, both of which normally extend down on opposite sides of the spoke end 13 in spaced relation therefrom, as best seen in Fig. 4. At either end of the spacer block the flanges carry identical integral lower protrusions 19a, 19b, 20a (Fig. 3), and 20b (not shown), for a purpose which will appear hereinafter. These protrusions project beyond the respective flat end faces 21 and 22 of the spacer block.

For mounting the spacer block releasably on the outer end of the wheel spoke, there is provided a generally hairpin shaped spring, indicated generally at 23. This spring is formed with an upper loop or bight portion 24 which overlies the outer face of the top wall of the spacer block and which extends down through spaced holes 25 and 26 in the spacer block. As shown in Fig. 4 when the spacer block and spring are assembled onto the spoke, the inner face of the loop portion 24 of the spring engages the top inner edges 25a and 26a, respectively, of the walls which define the holes 25 and 26. The outer face of the loop portion 24 of the spring bears against the outer wall portions 25b and 26b, respectively, of the walls which define these holes in the spacer block. By virtue of this construction the loop portion 24 of the spring is rather tightly received within the spacer block holes 25 and 26. At the underside of the spacer block the spring is formed with a pair of relatively sharp, arcuate, reverse bends 27, 28 for preventing accidental withdrawal of the spring from the spacer block. Since these reverse bends 27, 28 on the spring closely underlie the bottom face of the top wall 15 of the spacer block, the spacer block is closely confined by the loop 24 and the reverse bends 27, 28 on the spring and thus is held securely by the spring. Below these reverse bends the flexible, resilient, elongated, depending legs 29 and 30 flare outwardly to resiliently engage at their lower ends the inner side wall 31 of the spoke 12 which defines the spoke cavity 18, as best seen in Fig. 4.

The spacer block and spring assembly is initially mounted on the spoke by pressing the spring legs 29, 30 toward one another and inserting their free ends down into the spoke cavity 18. When the spring is compressed in this manner the shape and set of the spring is such that the inturned portions 27 and 28 of the spring prevent the spacer block from becoming loosened on the spring or separated therefrom. Of course, this action also takes place when the spacer block is being detached from the respective wheel spoke.

In use, individual spacer blocks are assembled onto the arcuate outer end of each of the hollow spokes of the wheel, as shown in Fig. 4, after the rim 32 carrying the inner tire 33 has been slid onto the wheel. As shown in Fig. 2, each spoke of the wheel is formed at its inboard side with a shoulder 34 presenting a beveled surface 35 which defines a seat for the beveled or gutter edge 36 of the inner tire rim 32. The rim 37 carrying the outer tire 38 is then mounted on the wheel with its inner face 37a engaging the end face 21 of the spacer block. A clamping lug 39, which has a beveled face 40 supporting the beveled or gutter edge 41 of the outer tire rim 37, is provided for forcing the outer rim 37 in an inboard direction to in turn force the spacer block 14 in the same direction. The opposite end face 22 of the spacer block is thereby forced tightly against the inner face 42 of the inner rim 32, and the inner rim is wedged tightly against the beveled shoulder 34 at the inboard side of the wheel. This action of the clamping lug 39 is accomplished by tightening a nut 43, which engages the outer side of the clamping lug, on a bolt 44 carried by the wheel spoke.

As indicated in Fig. 2, the protrusions 20a and 20b on the spacer block (as well as the protrusions 19a and 19b on the opposite side of the spacer block) underlie the tire rims. This prevents the spacer block from separating radially outward from the wheel spoke due to centrifugal force, in the event the rims should become loose on the wheel through failure to properly clamp the clamping lugs 39.

The depending flanges 19 and 20 on opposite sides of the spacer block are positioned to engage the arcuate outer end 13 of the spoke on opposite sides of the cavity 18 therein (Fig. 4), thereby preventing the spacer block from sliding off the wheel spoke in a circumferential direction.

It will be apparent that the inboard flat end face 22 of the spacer block engages the inner tire rim 32 entirely across its own length, which exceeds the circumferential extent of the outer end 13 of the spoke, and the outboard end face 21 of the spacer block similarly engages the outer tire rim 37 completely across its own length. Thus, at each wheel spoke the spacer block provides an extremely stable structure for securely maintaining the inner and outer tire rims in the desired spaced, parallel relation.

From the foregoing it will be seen that the above-disclosed embodiment of the spacer block is particularly effective to accomplish the objects and purposes of the present invention in an advantageous manner. It is to be understood that, while there has been disclosed herein a particular preferred construction of the present invention, various modifications, omissions and refinements which depart from the disclosed construction may be adopted without departing from the spirit and scope of the present invention.

I claim:

1. A spacer block for a dual wheel assembly having an outer wall shaped to overlie the outer end of a wheel spoke and formed with end faces for engagement respectively with the inboard and outboard tire rims of the dual wheel assembly, a pair of flanges depending from said outer wall at the opposite sides thereof for engagement respectively against the opposite outer sides of the outer end of the spoke to retain the spacer block on the spoke, and protrusions on the free ends of said flanges extending beyond the respective end faces of the outer wall of the spacer block to underlie the respective inboard and outboard tire rims.

2. A spacer block for a dual wheel assembly having an outer wall shaped to overlie the outer end of a wheel spoke and formed with end faces for engagement respectively with the inboard and outboard tire rims of the dual wheel assembly, a pair of spaced ribs depending from said outer wall to engage the outer end of the spoke, a pair of flanges depending from said outer wall at the opposite sides thereof for engagement respectively against the opposite outer sides of the outer end of the spoke to retain the spacer block on the spoke, and protrusions on the free ends of said flanges projecting beyond the respective end faces of the outer wall of the spacer block to underlie the respective inboard and outboard tire rims.

3. A dual wheel spacer block assembly, comprising a spacer block having an outer wall shaped to overlie the outer end of a hollow spoke of a wheel, said spacer block having a pair of flanges depending from said outer wall at the opposite sides thereof for engagement respectively against the opposite outer sides of the outer end of the spoke, and spring means having an attachment to said spacer block and including a pair of resilient spring legs which extend away from each other in a direction away from the spacer block for engagement with the inner side wall which defines the cavity in the hollow spoke.

4. A spacer block construction for a dual wheel assembly, comprising a spacer block having an outer wall shaped to overlie the outer end of a hollow spoke of a wheel and formed with end faces for engagement respectively with the inboard and outboard tire rims of the dual wheel assembly, a pair of flanges depending from said outer wall at the opposite sides thereof for engagement respectively against the opposite outer sides of the outer end of the spoke, and protrusions on the free ends of said flanges extending beyond the respective end faces of the outer wall of the spacer block to underlie the respective inboard and outboard tire rims, and spring means having an attachment to said spacer block and including a pair of resilient spring legs which extend away from each other in a direction away from the spacer block for engagement with the inner side wall which defines the cavity in the hollow spoke.

5. A spacer block construction for a dual wheel assembly, comprising a spacer block having an outer wall shaped to overlie the outer end of a hollow spoke of a wheel and formed with end faces for engagement respectively with the inboard and outboard tire rims of the dual wheel assembly, a pair of spaced ribs depending from said outer wall to engage the outer end of the spoke, a pair of flanges depending from said outer wall at the opposite sides thereof for engagement respectively against the opposite outer sides of the outer end of the spoke to retain the spacer block on the spoke, and protrusions on the free ends of said flanges projecting beyond the respective end faces of the outer wall of the spacer block to underlie the respective inboard and outboard tire rims, and spring means having an attachment to said spacer block and including a pair of resilient spring legs which extend away from each other in a direction away from the spacer block for engagement with the inner side wall which defines the cavity in the hollow spoke.

6. A spacer block construction for a dual wheel assembly, comprising a spacer block having an outer wall shaped to overlie the outer end of a hollow spoke of a wheel, a pair of spaced ribs depending from said outer wall to engage the outer end of the spoke, a pair of flanges depending from said outer wall at the opposite sides thereof and disposed for engagement respectively against the opposite outer sides of the outer end of the spoke, said spacer block having a pair of spaced holes intermediate its extent, and a spring having a loop portion overlying the outer face of said spacer block and extending through said holes therein and terminating at bent portions at the inner face of the spacer block preventing withdrawal of the spring from the spacer block, said spring at the inner side of the spacer block terminating in a pair of spaced, flexible, resilient leaf spring legs which flare outwardly from each other away from the spacer blocks to engage the inner side wall which defines the cavity in the hollow spoke.

7. A spacer block construction for a dual wheel assembly, comprising a spacer block having an outer wall shaped to overlie the outer end of a hollow spoke of a wheel and formed with end faces for engagement respectively with the inboard and outboard tire rims of the dual wheel assembly, a pair of spaced ribs depending from said outer wall to engage the outer end of the spoke, a pair of flanges depending from said outer wall at the opposite sides thereof for engagement respectively against the opposite outer sides of the outer end of the spoke to retain the spacer block on the spoke, and protrusions on the free ends of said flanges projecting beyond the respective end faces of the outer wall of the spacer block to underlie the respective inboard and outboard tire rims, said spacer block having a pair of spaced holes intermediate its extent, and a spring for mounting said spacer block on the spoke, said spring having a loop portion overlying the outer side of the spacer block and extending through said holes in the spacer block in engagement with oppositely disposed wall portions defining each hole to be tightly positioned in said holes, said loop portion terminating at reversely bent portions directly underlying the inner side of said spacer block and maintaining the spring against withdrawal through said holes in the spacer block, said spring terminating remote from said loop portion in a pair of spaced, flexible, resilient leaf spring legs which are biased outwardly from each other to engage the inner side wall which defines the cavity in the hollow spoke.

8. In combination, a wheel having a spoke which is formed with a cavity open at the outer end of the spoke, a spacer block overlying the outer end of the wheel spoke, and spring means attached to said spacer block and extending into said cavity in the spoke, said spring means including a pair of resilient spring legs which extend away from each other within the wheel cavity into engagement with spaced portions of the inner side wall which defines the cavity in the spoke to retain the spacer block on the spoke.

9. In combination, a wheel having a hollow spoke which is formed with a cavity open at the outer end of the spoke, a spacer block overlying the outer end of the wheel spoke, said spacer block having a pair of holes intermediate its extent communicating with said cavity in the wheel spoke, and a spring having a loop portion overlying the outer face of said spacer block and extending through said holes therein and terminating in bent portions underlying the inner face of said spacer block to prevent withdrawal of the spring from the spacer block, said spring at the inner face of the spacer block terminating in a pair of spaced, flexible, resilient leaf spring legs disposed in said cavity in the spoke and flaring upwardly from each other into engagement with spaced portions of the inner side wall of the spoke which defines said cavity therein.

10. In combination, a wheel having a hollow spoke formed with a cavity which is open at the outer end of the spoke, a spacer block overlying the outer end of the wheel spoke, said spacer block being formed with a pair of holes intermediate its extent communicating with said cavity in the wheel spoke, and a spring for mounting said spacer block on the wheel spoke, said spring having a loop portion overlying the outer face of the spacer block and extending through said holes therein in engagement with oppositely disposed wall portions defining each hole to be tightly positioned in said holes, said loop portion terminating at reversely bent portions disposed directly underlying the inner face of said spacer block and maintaining the spring against withdrawal through said holes in the spacer block, said spring terminating remote from said loop portion in a pair of spaced, flexible, resilient leaf spring legs disposed in said cavity and biased outwardly from each other into engagement with opposed portions of the inner side wall of the spoke which defines said cavity therein.

11. In combination, a wheel having a hollow spoke formed with a cavity open at the outer end of the spoke, a spacer block having an outer wall overlying said outer end of the spoke, said spacer block having a pair of flanges depending from said outer wall on opposite sides thereof and respectively overlapping the opposite outer sides of the outer end of the spoke, and spring means attached to said spacer block and extending into said cavity in the spoke, said spring means including a pair of resilient spring legs which extend away from each other within the spoke cavity into engagement with opposed portions of the inner side wall which defines the cavity in the spoke to retain the spacer block on the spoke.

12. In combination in a dual wheel assembly, a wheel having a hollow spoke formed with a cavity open at the outer end of the spoke, a spacer block having an outer wall overlying said outer end of the spoke and formed with end faces for engagement respectively with the inboard and outboard tire rims of the dual wheel assembly, said spacer block having a pair of flanges depending from said outer wall on opposite sides thereof and respectively overlapping the opposite outer sides of the outer end of the spoke, protrusions on the free ends of said flanges projecting beyond the respective end faces of the outer wall of the spacer block to underlie the respective inboard and outboard tire rims, and spring means attached to said spacer block and extending into said cavity in the spoke, said spring means including a pair of resilient spring legs which extend away from each other within the spoke cavity into engagement with opposed portions of the inner side wall which defines the cavity in the spoke to retain the spacer block on the spoke.

13. In combination in a dual wheel assembly, a wheel having a hollow spoke formed with a cavity open at the outer end of the spoke, a spacer block having an outer wall overlying said outer end of the spoke and formed with end faces for engagement respectively with the inboard and outboard tire rims of the dual wheel assembly, a pair of spaced ribs depending from said outer wall of the spacer block and engaging said outer end of the spoke, a pair of flanges depending from said outer wall on opposite sides thereof and respectively overlapping the opposite outer sides of the outer end of the spoke, and protrusions on the free ends of said flanges projecting beyond the respective end faces of the outer wall of the spacer block to underlie the respective inboard and outboard tire rims, and spring means attached to said spacer block and extending into said cavity in the spoke, said spring means including a pair of resilient spring legs which extend away from each other within the spoke cavity into engagement with opposed portions of the inner side wall which defines the cavity in the spoke to retain the spacer block on the spoke.

14. In combination in a dual wheel assembly, a wheel having a hollow spoke formed with a cavity open at the outer end of the spoke, a spacer block having an outer wall overlying said outer end of the spoke and a pair of spaced ribs depending from said outer wall and engaging said outer end of the spoke, said spacer block being formed with a pair of flanges depending from its outer wall on opposite sides thereof and respectively overlapping the opposite outer sides of the outer end of the spoke, said spacer block having a pair of spaced holes intermediate its extent, and a spring having a loop portion overlying the outer face of the outer wall of said spacer block and extending through said holes therein and terminating at bent portions underlying the inner face of said outer wall of the spacer block to prevent withdrawal of the spring from the spacer block, said spring terminating within said cavity in the wheel spoke in a pair of spaced, flexible, resilient leaf spring legs biased outwardly from each other into engagement with opposed portions of the inner side wall which defines the cavity in the hollow wheel spoke.

15. In combination in a dual wheel assembly, a wheel having a hollow spoke formed with a cavity open at the outer end of the spoke, a spacer block having an outer wall overlying said outer end of the spoke and formed with end faces for engagement respectively with the inboard and outboard tire rims of the dual wheel assembly, said spacer block having a pair of spaced ribs depending from said outer wall and engaging said outer end of the spoke, said spacer block being formed with a pair of flanges depending from its outer wall on opposite sides thereof and respectively overlapping the opposite outer sides of the outer end of the spoke, protrusions on the free ends of said flanges projecting beyond the respective end faces of the spacer block to underlie the respective inboard and outboard tire rims, said spacer block having a pair of spaced holes intermediate its extent, and a spring for mounting said spacer block on the spoke, said spring having a loop portion overlying the outer face of said outer wall of the spacer block and extending through said holes in the spacer block in engagement with oppositely disposed wall portions defining each hole to be tightly received in said holes, said loop portion terminating at reversely bent portions directly underlying the inner face of said outer wall of the spacer block and maintaining the spring against withdrawal through said holes in the spacer block, said spring terminating remote from said loop portion in a pair of spaced, flexible, resilient leaf spring legs which are biased outwardly from each other into engagement with the inner side wall which defines the cavity in the hollow spoke.

16. A dual wheel spacer block assembly comprising, an arcuate spacer block shaped to overlie the outer end of a hollow spoke of a wheel and having opposed arched end faces extending parallel to each other for engagement with the inboard and outboard rims of a dual wheel assembly, and spring means having an attachment to said spacer block and including a pair of resilient spring legs which extend from the concave side of said block, said legs diverging away from each other in a plane which extends parallel to the arched end faces of said block for engagement with the inner side wall which defines the cavity of the hollow spoke.

17. A dual wheel spacer block assembly comprising an arcuate spacer block shaped to overlie the outer end of a hollow spoke of a wheel and having opposed arched end faces extending parallel to each other for engagement with the inboard and outboard tire rims of a dual wheel assembly, said spacer block having a pair of spaced holes intermediate said arched end faces, and a spring having a loop portion overlying the outer face of said spacer block and extending through the holes therein and terminating in inwardly bent portions at the concave inner face of said spacer block to prevent withdrawal of the spring from the spacer block, said spring having resilient leaf spring legs on said bent portions extending from the concave side of said block and flaring outwardly from each other in a plane which extends parallel to the arched end faces of said spacer block to engage the inner side wall which defines the cavity of the spoke.

18. A dual wheel spacer block assembly comprising, an arcuate spaced block shaped to overlie the outer end of a hollow spoke of a wheel and having opposed arched end faces extending parallel to each other for engagement with the inboard and outboard rims of a dual wheel assembly, said spacer block having a pair of spaced holes intermediate said arched end faces, and a spring for mounting said spacer block on the spoke, said spring having a loop portion overlying the outer convex side of the spacer block and extending through said holes in the spacer block in engagement with oppositely disposed wall portions defining each hole to be tightly positioned in said holes, said loop terminating in reversely bent portions directly underlying the inner concave side of said spacer block and maintaining the spring against withdrawal through said holes in the spacer block, said spring terminating remote from said loop portion in a pair of spaced, flexible leaf spring legs disposed in a plane extending parallel to the arched end faces of said block and biased outwardly from each other to engage the inner side wall which defines the cavity in the hollow spoke.

References Cited in the file of this patent

UNITED STATES PATENTS

| | | |
|---|---|---|
| 2,001,407 | Burger | May 14, 1935 |
| 2,006,747 | Ritz-Woller | July 2, 1935 |
| 2,576,683 | Horn | Nov. 27, 1951 |

FOREIGN PATENTS

| | | |
|---|---|---|
| 449,145 | Great Britain | June 22, 1936 |